US009283634B2

(12) United States Patent
Wakisaka et al.

(10) Patent No.: US 9,283,634 B2
(45) Date of Patent: Mar. 15, 2016

(54) ARC WELDING METHOD AND ARC WELDING APPARATUS

(71) Applicant: HONDA MOTOR CO., LTD., Tokyo (JP)

(72) Inventors: Taisei Wakisaka, Tochigi (JP); Masahito Mutou, Tochigi (JP); Tokuji Okumura, Tochigi (JP); Takanori Suzuki, Tochigi (JP); Shinya Oyama, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 74 days.

(21) Appl. No.: 14/247,420

(22) Filed: Apr. 8, 2014

(65) Prior Publication Data

US 2014/0305920 A1 Oct. 16, 2014

(30) Foreign Application Priority Data

Apr. 10, 2013 (JP) ................................. 2013-082048

(51) Int. Cl.
*B23K 1/20* (2006.01)
*B23K 1/19* (2006.01)
*B23K 9/167* (2006.01)

(52) U.S. Cl.
CPC ... *B23K 1/20* (2013.01); *B23K 1/19* (2013.01); *B23K 1/206* (2013.01); *B23K 9/167* (2013.01)

(58) Field of Classification Search
CPC ............ B23K 1/20; B23K 1/19; B23K 9/167; B23K 1/206
USPC ............. 219/74, 76.15, 75, 109, 121.64, 129, 219/130.4
See application file for complete search history.

(56) References Cited

U.S. PATENT DOCUMENTS

| 2001/0030181 | A1* | 10/2001 | Kim | 219/145.22 |
| 2003/0183604 | A1* | 10/2003 | Zhang et al. | 219/121.45 |
| 2006/0243715 | A1* | 11/2006 | Borne et al. | 219/125.1 |
| 2006/0289394 | A1* | 12/2006 | Revel et al. | 219/75 |

(Continued)

FOREIGN PATENT DOCUMENTS

| JP | 05161967 | * | 6/1993 | | B23H 9/02 |
| JP | 7-100652 | | 4/1995 | | |
| JP | 2011-110604 | | 6/2011 | | |
| JP | 2011110604 | A * | 6/2011 | | B23K 9/12 |

OTHER PUBLICATIONS

Chinese Office Action with English Translation dated Sep. 6, 2015, 10 pages.

*Primary Examiner* — Thien S Tran
(74) *Attorney, Agent, or Firm* — Rankin, Hill & Clark LLP

(57) ABSTRACT

Provided is an arc welding method and arc welding apparatus for arc welding by a brazing filler metal two base materials subjected to a plating process. An arc welding method for arc welding two base materials, at least one of which has a plating layer thereon, by a brazing filler material, performs alternately a plating layer removal process of removing a plating layer by performing arc discharge at a first current value while moving a welding torch along a welding line in a state of stopping feed of the brazing filler metal, and a brazing filler metal welding process of welding the brazing filler metal to a position where the plating layer is removed, by performing arc discharge at a second current value smaller than the first current value while feeding the brazing filler metal in a state of stopping a movement of the welding torch.

3 Claims, 6 Drawing Sheets

(56) References Cited

U.S. PATENT DOCUMENTS

| | | | |
|---|---|---|---|
| 2008/0047458 A1* | 2/2008 | Storm et al. | 102/501 |
| 2009/0017328 A1* | 1/2009 | Katoh et al. | 428/653 |
| 2010/0012638 A1* | 1/2010 | Fortain et al. | 219/137 R |
| 2014/0116993 A1* | 5/2014 | Nowak et al. | 219/74 |

* cited by examiner

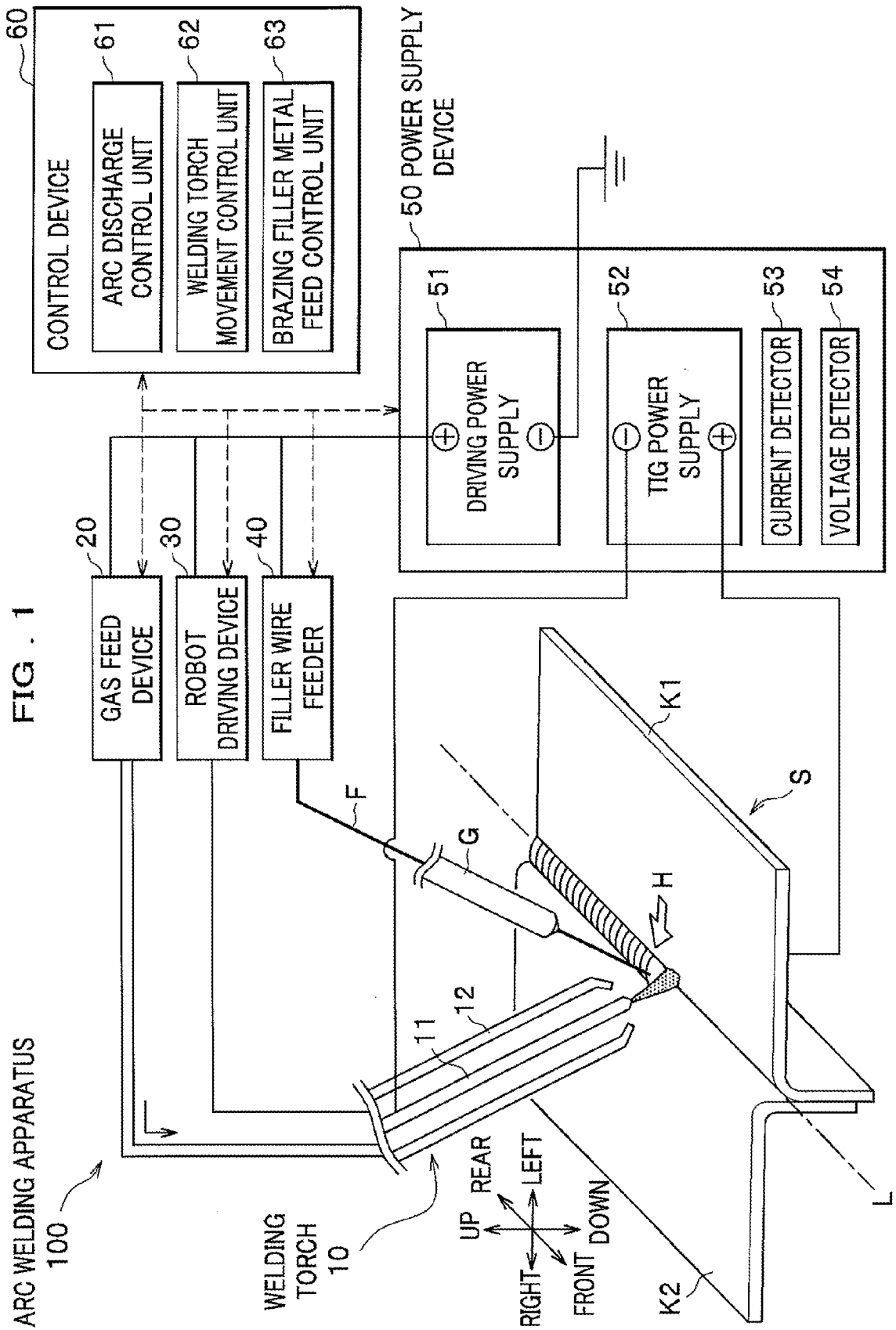

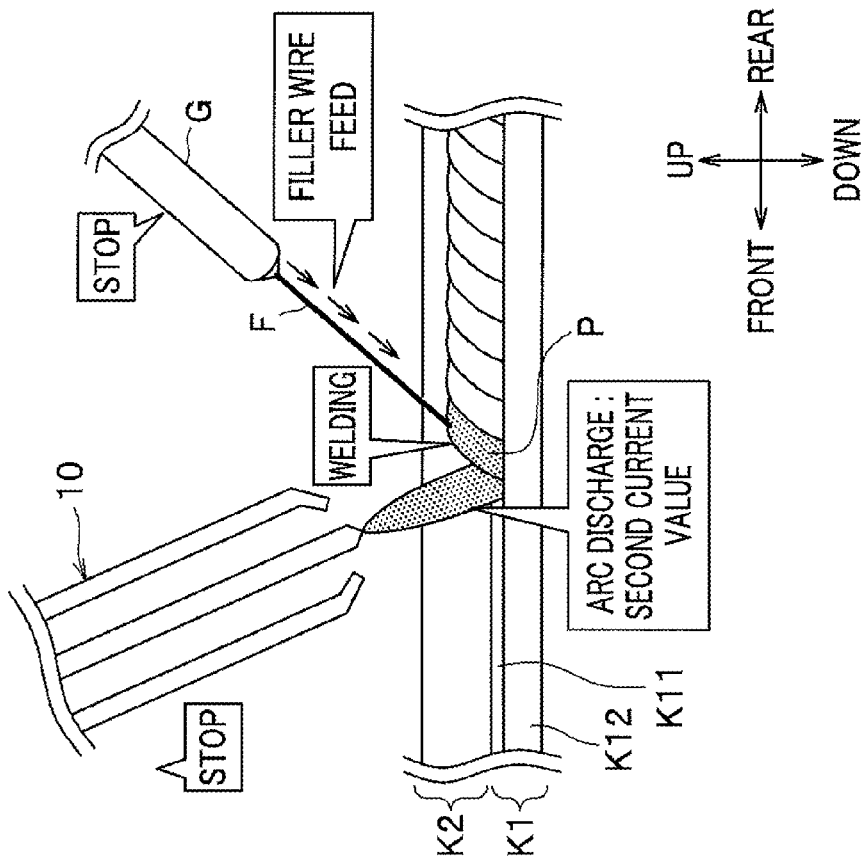
FIG. 2A PLATING LAYER REMOVAL PROCESS
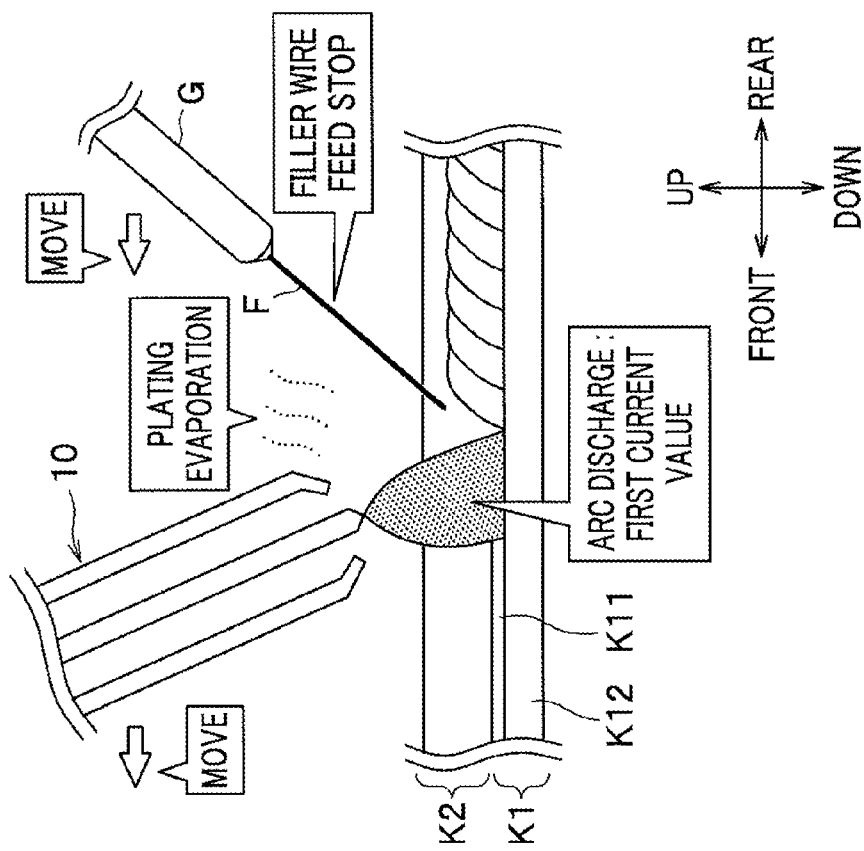
FIG. 2B BRAZING FILLER METAL WELDING PROCESS

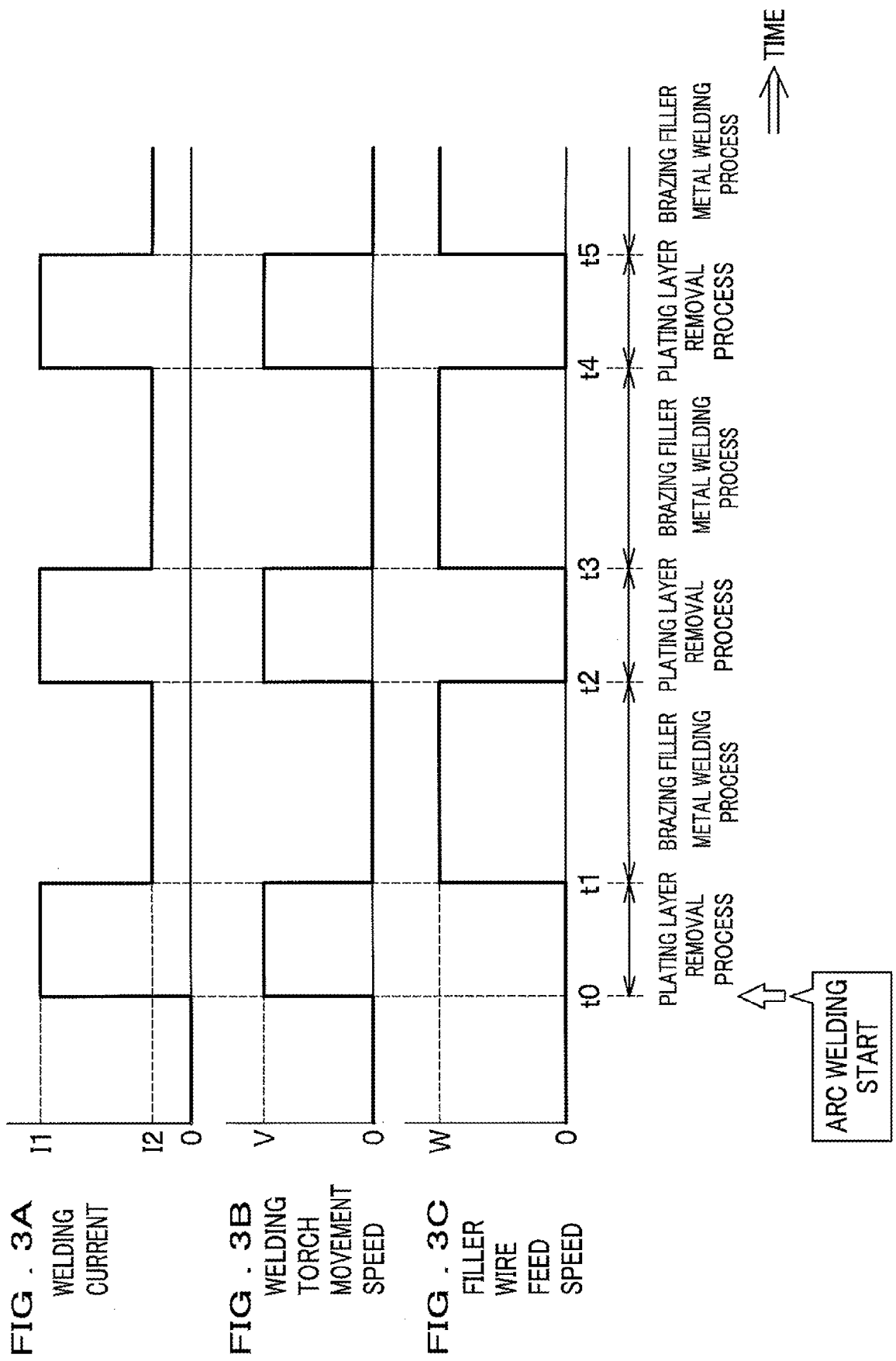

PRESENT EMBODIMENT

Zn LAYER / Si LAYER / Fe LAYER

COMPARATIVE EXAMPLE

Zn LAYER / Fe-Al BASED INTERMETALLIC COMPOUND LAYER / Fe LAYER

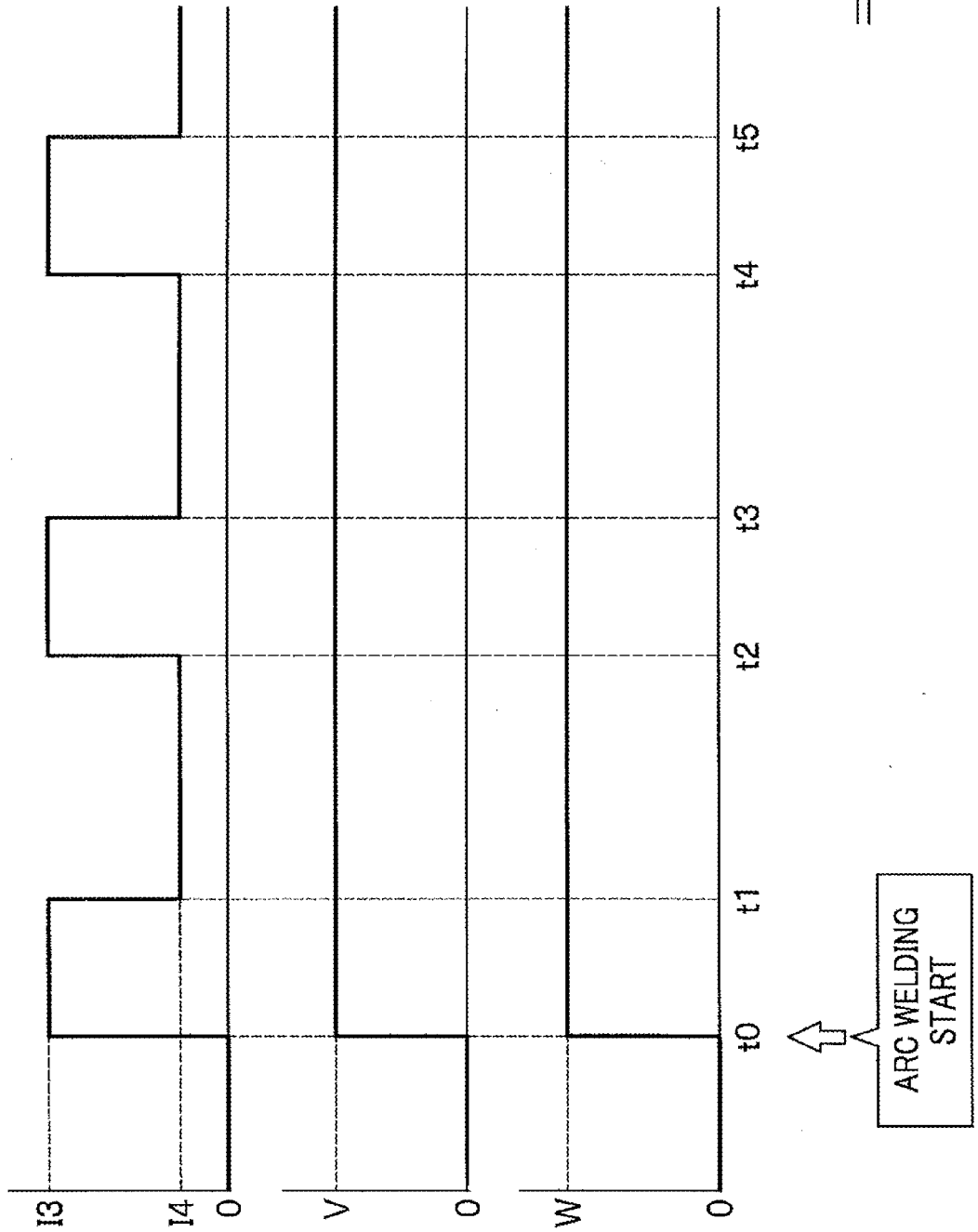

ARC WELDING METHOD AND ARC WELDING APPARATUS

CROSS REFERENCE TO RELATED APPLICATIONS

This application claims the foreign priority benefit under Title 35, United States Code, 119 (a)-(d) of Japanese Patent Application No. 2013-082048 filed on Apr. 10, 2013 in the Japan Patent Office, the disclosure of which is herein incorporated by reference in its entirety.

TECHNICAL FIELD

The present invention relates to an arc welding method and an arc welding apparatus for arc welding two base materials by using a brazing filler metal.

BACKGROUND ART

Conventionally, there has been known an arc welding (so-called an arc brazing) which generates an arc discharge between a welding torch and base materials, melts a filler wire (brazing filler metal) by high heat of the arc discharge, and fuses the base materials and the brazing filler metal to be mixed at a molecular level. There is an advantage that the base materials can be welded relatively easily even if a joint portion between the base materials is a complicated shape, because the molten brazing filler metal enters a narrow gap of the joint portion by performing the arc welding.

Patent Document 1, for example, discloses a pulse arc welding method in which while generating the arc discharge between the base materials by supplying an arc current in a pulse shape to a non-consumable electrode, the filler wire is intermittently fed to be synchronized with the pulse of the arc current. Note that, in Patent Document 1, it is adopted that the filler wire is melted when a value of the arc current is a peak current (>a base current), and the filler wire is not melted when the value is the base current.

CITATION LIST

Patent Literature

{Patent Document 1}
Japanese Patent Application Publication No. 2011-110604

SUMMARY OF INVENTION

Technical Problem

Members used in an automobile or the like are in many cases subjected to a plating process for the purpose of surface protection and antioxidation. In addition, the boiling point of the brazing filler metal is in most cases lower than a melting point of a plating layer (for example, Zn). Then, when base materials having the plating layer are joined, the following problems occur in the invention described in Patent Document 1.

First, if the peak current is set to a temperature at which the filler wire is melt without removing the plating layer, a bead (swelling of welding mark) is formed on the plating layer. In this case, there is a problem that a joint strength is weak, because the plating layer remains on a joint interface between the bead and the base materials. Second, if the peak current is set to a temperature to melt and scatter (evaporate) the plating layer, the brazing filler metal (whose boiling point is lower than the melting point of the plating layer) evaporates, and there is a problem that the base materials are not welded properly.

Therefore, the object of the present invention is to provide an arc welding method and an arc welding apparatus for appropriately welding two base materials, at least one of which has been subjected to the plating process, by using a brazing filler metal.

Solution to Problem

In order to solve the above problems, an arc welding method according to the present invention is an arc welding method for arc welding two base materials, at least one of which has a plating layer thereon, by a brazing filler metal, and is characterized in that the method performs alternately a plating layer removal process of removing a plating layer by performing an arc discharge at a first current value while moving a welding torch along a welding line in a state of stopping feed of the brazing filler metal, and a brazing filler metal welding process of welding the brazing filler metal to a position where the plating layer is removed, by performing the arc discharge at a second current value smaller than the first current value while feeding the brazing filler metal in a state of stopping a movement of the welding torch.

According to such a configuration, the plating layer removal process removes the plating layer by performing arc discharge at the first current value while moving the welding torch in the state of stopping feed of the brazing filler metal. As a result, it is possible to expose the metal or the like which has been previously coated with the plating layer. Further, during the arc discharge at the first current value, by stopping feed of the brazing filler metal, the brazing filler metal can be prevented from evaporating owing to heat of the arc discharge. Note that, the "welding line" mentioned above is a straight or curved line in which the brazing filler metal is to be extended as a layer (continuous beads) when welding the two base materials.

Further, in the state of stopping the movement of the welding torch, the brazing filler metal welding process performs arc discharge at the second current value while feeding the brazing filler metal, and welds the brazing filler metal to the position where the plating layer is removed. That is, the base materials are welded in a state where the plating layer is not interposed between the brazing filler metal and the two base materials, and thereby the joint strength can be enhanced.

Further, in the arc welding method according to the present invention, it is preferable that one of the two base materials is a first base material which is an Fe-based metallic member coated with the plating layer containing Zn, the other is a second base material which is an Al-based metallic member, and the brazing filler metal is a ZnSi-based brazing filler metal.

According to such a configuration, by arc welding the first base material which is the Fe-based metallic member coated with the plating layer containing Zn, and the second base material which is the Al-based metallic member, by the ZnSi-based brazing filler metal, the brazing filler metal and each of the base materials form the following three-layer structure. That is, the three-layer structure includes a first layer which is adjacent to the Fe-based metallic member and mainly composed of Fe, a second layer which is adjacent to the Al-based metallic member and mainly composed of Zn, and a third layer which is interposed between the first and second layers and mainly composed of Si.

In this manner, by interposing the third layer mainly composed of Si between the first and second layers, Al can be prevented from diffusing to the side of the Fe-based metallic member (first base material). As a result, an Fe—Al-based intermetallic compound layer can be prevented from being formed in a vicinity of the joint interface, and thereby the joint strength can be enhanced.

Further, in the arc welding method according to the present invention, it is preferable that, in the brazing filler metal welding process, a tip end of a filler wire which is the brazing filler metal is positioned behind an arc in a traveling direction thereof, and the filler wire is fed so that the tip end thereof is soaked in a molten pool.

According to such a configuration, the filler wire which is the brazing filler metal is not heated directly in the arc, but is heated indirectly by soaking the tip end thereof in the molten pool. That is, since the tip end of the filler wire is not placed in the arc, the filler wire can be prevented from evaporating or melting to be a droplet owing to heat of the arc discharge. Further, by positioning the tip end of the filler wire behind the arc in the traveling direction thereof, the tip end can be soaked in a high temperature portion, which has not been cooled yet, out of a spread of the molten pool, and thereby the filler wire can be melted.

Further, an arc welding apparatus according to the present invention is an arc welding apparatus for arc welding two base materials, at least one of which has a plating layer thereon, by a brazing filler metal, and is characterized in that the arc welding apparatus includes a welding torch which performs arc discharge between the welding torch and the two base materials, an arc discharge unit which performs arc discharge by supplying the welding torch with two currents alternately, one of the two currents corresponding to a first current value for removing the plating layer by the arc discharge, and the other corresponding to a second current value which melts the brazing filler metal and is smaller than the first current value, a welding torch movement unit which moves the welding torch along a welding line during the arc discharge at the first current value, and stops the movement of the welding torch during the arc discharge at the second current value, and a brazing filler metal feed unit which does not feed the brazing filler metal during the arc discharge at the first current value, and feeds the brazing filler metal during the arc discharge at the second current value so as to be welded to the position where the plating layer is removed.

According to such a configuration, by performing arc discharge from the welding torch at the first current value by the arc discharge unit, the plating layer can be removed. Further, during the arc discharge at the first current value, the welding torch is moved along the welding line by the welding torch movement unit, and the feed of the brazing filler metal is stopped by the brazing filler metal feed unit. Therefore, the metal or the like which has been previously coated with the plating layer can be exposed, and thereby the brazing filler metal can be prevented from evaporating owing to heat of the arc discharge.

Further, during the arc discharge at the second current value by the arc discharge unit, the movement of the welding torch is stopped by the welding torch movement unit, and the brazing filler metal is fed by the brazing filler metal feed unit to be welded to the position where the plating layer is removed. Therefore, the base materials can be welded in the state where the plating layer is not interposed between the brazing filler metal and the two base materials, and thereby the joint strength can be enhanced.

Advantageous Effects of Invention

According to the present invention, it is possible to provide an arc welding method and an arc welding apparatus for appropriately arc welding the two base materials, at least one of which has been subjected to the plating process, by using the brazing filler metal.

BRIEF DESCRIPTION OF DRAWINGS

FIG. 1 is a block diagram of an arc welding apparatus according to an embodiment of the present invention;

FIG. 2A is an explanatory view showing a plating layer removal process in a procedure when performing an arc welding (view as seen from the left side of a joint structure in FIG. 1);

FIG. 2B is an explanatory view showing a brazing filler metal welding process in the procedure when performing the arc welding (view as seen from the left side of the joint structure in FIG. 1);

FIG. 3A is a time chart of a welding current in a process of the arc welding apparatus according to the present embodiment;

FIG. 3B is a time chart of a movement speed of a welding torch in the process of the arc welding apparatus according to the present embodiment;

FIG. 3C is a time chart of a feed speed of a filler wire in the process of the arc welding apparatus according to the present embodiment;

FIG. 6A is a time chart of a welding current in a process of the arc welding apparatus according to the comparative example;

FIG. 6B is a time chart of a movement speed of a welding torch in the process of the arc welding apparatus according to the comparative example; and FIG. 6C is a time chart of a feed speed of a filler wire in the process of the arc welding apparatus according to the comparative example.

DESCRIPTION OF EMBODIMENTS

Figure 4:
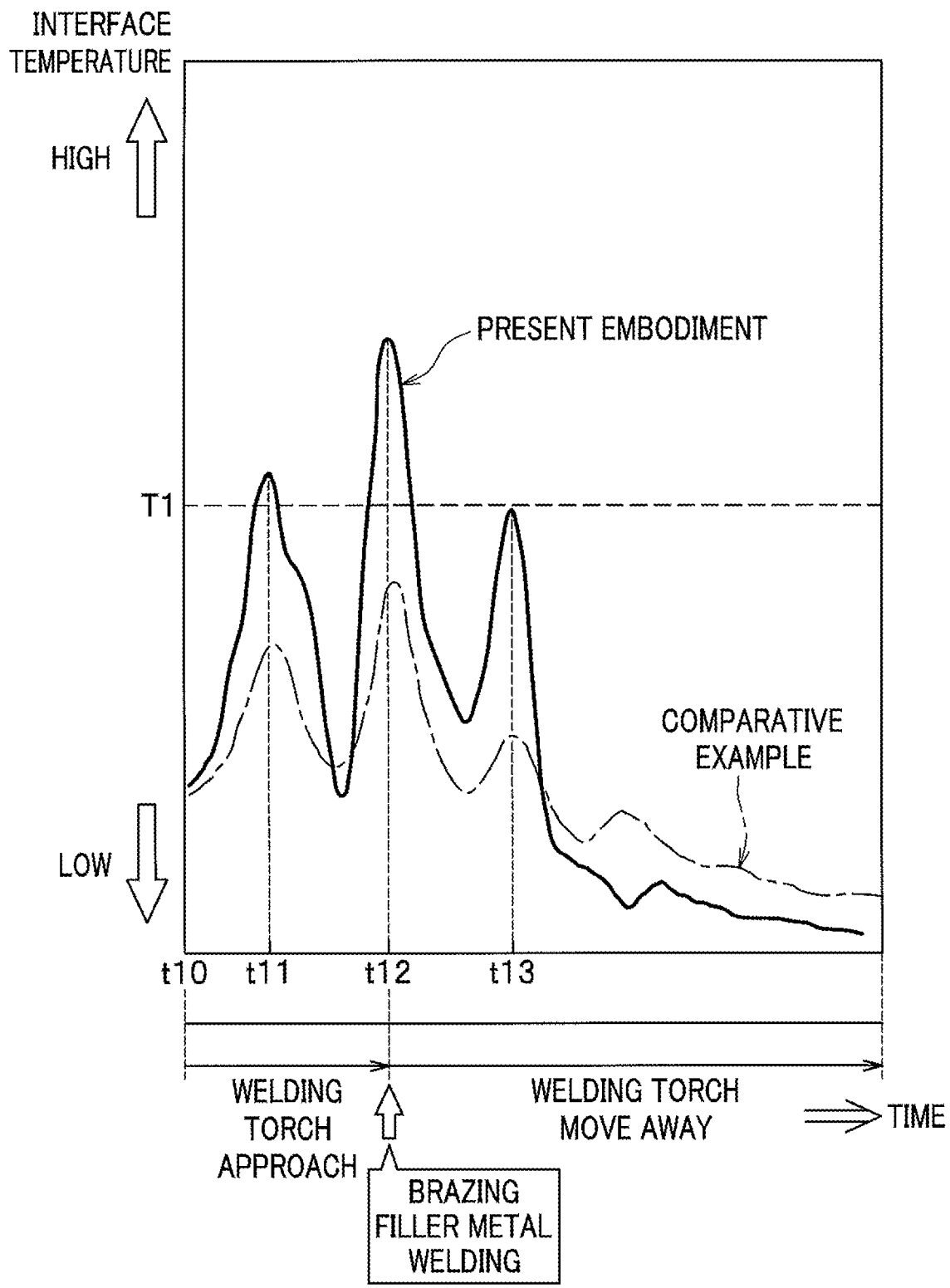
FIG. 4 is a graph showing temperature variations in a vicinity of a joint interface between base materials and a brazing filler metal, in the arc welding apparatus according to the present embodiment (solid line) and an arc welding apparatus according to a comparative example (one-dot chain line)

Hereinafter, embodiments for performing the present invention will be described in detail with reference to accompanying drawings. Note that, a "base material" means a member to be joined to each other by an arc welding in the following description. Further, a "brazing filler metal" means a joining medium to be used in the welding.

Embodiment

FIG. 1 is a block diagram of an arc welding apparatus according to an embodiment of the present invention. A front and rear direction, a left and right direction, and an up and down direction are defined as shown in FIG. 1. Further, solid lines show power lines, and dashed arrows show signal lines in FIG. 1. An arc welding apparatus 100 is a device for welding two base materials K1, K2 by welding a filler wire F (that is, a brazing filler metal) to the two base materials K1, K2 by heat of an arc discharge generated between a welding torch 10 and the two base materials K1, K2. Hereinafter, the two base materials K1, K2, the filler wire F which is the brazing filler metal, and a filler wire guide G for guiding feed of the filler wire F will be sequentially described before describing the arc welding apparatus 100.

A first base material K1 shown in FIG. 1 is a plate-like member (steel plate) made of an Fe-based metallic member subjected to a plating process with Zn, and has a hook shape (L-shape) as seen from the front side. A second base material K2 is an Al-based metallic member, and has a hook shape as seen from the front side. Incidentally, a melting point of a plating layer K11 (Zn plating layer: see FIGS. 2A, 2B) of the first base material K1 is approximately 1200° C.

As shown in FIG. 1, a bent portion of the first base material K1 and a bent portion of the second base material K2 are opposed to each other in the left and right direction, and the base materials are abutted against each other so that the portions thereof extending in a rectangular shape in a plain view have a difference in level (a height of the first base material K1 is lower than a height of the second base material K2). Then, a groove formed by the both bent portions of the two base materials K1, K2 is a welding line L, and the base materials K1, K2 are joined together by being arc welded along the welding line L. Note that, the "welding line L" is a straight line or curved line in which the brazing filler metal is to be extended as a layer (continuous beads) when joining the two base materials K1, K2. Further, the two base materials K1, K2 are positioned by a predetermined securing member (not shown) or a robot (not shown).

The filler wire F is a ZnSi-based brazing filler metal formed in a wire shape, and is fed by a filler wire feeder 40 in accordance with an instruction from a control device 60 to be described later. A melting point of the ZnSi-based filler wire F (brazing filler metal) is approximately 420° C., and a boiling point thereof is approximately 907° C. That is, the melting point and boiling point of the filler wire F are lower than the melting point (1200° C.) of the plating layer K11 (Zn plating layer: see FIGS. 2A, 2B) of the first base material K1.

The filler wire guide G is a cylindrical member having the filler wire F as an axial line thereof, and is adapted to guide the filler wire F (brazing filler metal) fed by the filler wire feeder 40. The filler wire guide G is held by a multi-axis articulated robot (not shown) so that the axial line thereof is inclined to the rear side by a predetermined angle from the vertical direction. In the present embodiment, it is assumed that a relative position of the welding torch 10 and the filler wire guide G is fixed so that the filler wire F is positioned behind an arc in a traveling direction thereof (see FIGS. 2A, 2B). Distances between the filler wire guide G and the respective base materials K1, K2, and the angle of the axial line of the filler wire guide G are set in advance.

<Configuration of Arc Welding Apparatus>

As shown in FIG. 1, the arc welding apparatus 100 includes a welding torch 10, a gas feed device 20, a robot driving device 30, a filler wire feeder 40, a power supply device 50, and a control device 60.

(Welding Torch)

The welding torch 10 is adapted to perform arc discharge by guiding a welding current to a non-consumable electrode 11 made of tungsten or the like, and supply a shielding gas for shielding a welding portion from the outside air. The welding torch 10 has the non-consumable electrode 11 of a rod shape, a cylindrical nozzle 12 extending to have the non-consumable electrode 11 as an axial line thereof, and a collet body (not shown) for holding the non-consumable electrode 11 in the nozzle 12. The welding torch 10 is held by the multi-axis articulated robot (not shown) so that the axial line thereof is inclined to the front side by a predetermined angle from the vertical direction. Note that, the distances (heights) between the welding torch 10 and the base materials, and the angle of the axial line of the welding torch 10 are set in advance. In the present invention, by controlling operations of the multi-axis articulated robot by the control device 60, the welding torch 10 is stopped or moved along the welding line L, and the filler wire guide G is also moved so as to follow the welding torch 10 from behind.

(Gas Feed Device)

The gas feed device 20 is adapted to eject inert gases such as argon gas and helium gas as the shielding gas from a nozzle 12. Hereby, the molten brazing filler metal and the like can be prevented from reacting with oxygen or nitrogen contained in the outside air.

(Robot Driving Device)

The robot driving device 30 is an actuator or the like for driving the multi-axis articulated robot in accordance with the instruction from the control device 60, and has a function of moving the welding torch 10 and the filler wire guide G along the welding line L.

(Filler Wire Feeder)

The filler wire feeder 40 is a device for pulling out a wire-shaped filler (brazing filler metal) from a brazing filler metal container (not shown) in accordance with the instruction of the control device 60, and feeding the brazing filler metal via the filler wire guide G. Although it will be described in detail later, the filler wire feeder 40 is controlled by a brazing filler metal feed control unit 63 so that a tip end of the filler wire F is soaked in a molten pool P (see FIG. 2B). The "molten pool P" means the brazing filler metal in a molten state accumulated on the welding line L. The molten pool P is solidified to form the beads, and the plurality of beads are imbricated along the welding line L to form the layer.

(Power Supply Device)

The power supply device 50 is a device for supplying a power required for the arc welding, and has a driving power supply 51, a TIG (Tungsten Insert Gas) power supply 52, a current detector 53, and a voltage detector 54. The driving power supply 51 is a power supply for converting a commercial three-phase AC power to a DC power by a transformer (not shown), and supplying the power to the gas feed device 20, the robot driving device 30, and the filler wire feeder 40 in accordance with the instruction from the control device 60. A positive electrode of the driving power supply 51 is electrically connected to the gas feed device 20, the robot driving device 30, and the filler wire feeder 40, and a negative electrode of the driving power supply 51 is grounded.

The TIG power supply 52 is a power supply for converting the commercial three-phase AC power to the DC power by the transformer (not shown), and for generating arc discharge in accordance with the instruction from the control device 60. A positive electrode of the TIG power supply 52 is electrically connected to the two base materials K1, K2, and a negative electrode of the TIG power supply 52 is electrically connected to the non-consumable electrode 11 of the welding torch 10.

The current detector 53 is adapted to detect a current value or the like of the arc discharge generated between the two base materials K1, K2 and the non-consumable electrode 11 of the welding torch 10. The current detector 53 outputs the detected current value to the control device 60. The voltage detector 54 is adapted to detect a voltage value of the arc discharge generated between the two base materials K1, K2 and the non-consumable electrode 11 of the welding torch 10. The voltage detector 54 outputs the detected voltage value to the control device 60.

(Control Device)

The control device 60 is adapted to control the driving of the gas feed device 20, the robot driving device 30, and the filler wire feeder 40. The control device 60 is configured to include a CPU (Central Processing Unit), a ROM (Read Only Memory), a RAM (Random Access Memory), a HDD (Hard Disk Drive), and electric circuits such as various interfaces, and exerts various functions by operating in accordance with programs stored therein. The control device 60 has an arc discharge control unit 61, a welding torch movement control unit 62, and the brazing filler metal feed control unit 63.

The arc discharge control unit 61 controls the welding current from the TIG power supply 52 so that the currents respectively corresponding to a current value I1 (first current value) and a current value I2 (second current value) smaller than the current value I1 are alternately supplied (see FIG. 3A). An "arc discharge unit" which generates the arc discharge between the welding torch 10 and the two base materials K1, K2 is configured to include the power supply device 50 and the arc discharge control unit 61.

The current value I1 described above is a current value capable of removing the plating layer K11 (see FIGS. 2A, 2B) by melting and scattering (evaporating) the plating layer by direct heat of the arc discharge. In other words, the current value I1 is set so that the temperature of the plating layer K11 (Zn) becomes higher than the melting point (approximately 1200° C.) thereof by heat of the arc discharge. The current value I2 (<I1) described above is a current value capable of melting the filler wire F which is the brazing filler metal. The current value I2 is, for example, set so that the temperature of the brazing filler metal (ZnSi) becomes higher than the melting point (approximately 420° C.) thereof and lower than the boiling point (approximately 907° C.) thereof, by indirect heat of the arc discharge. Note that, the current value I2 may be set to zero.

The current values I1, I2 are set in advance based on a preliminary experiment or the like, and stored in a storage unit (not shown) included in the control device 60.

The welding torch movement control unit 62 controls the robot driving device 30 (see FIG. 3B) so that the welding torch 10 is moved along the welding line L (see FIG. 1) during the arc discharge at the current value I1, and the welding torch 10 is stopped during the arc discharge at the current value I2 (<I1). Further, the welding torch movement control unit 62 moves the filler wire guide G so as to keep the relative position with respect to the welding torch 10. Note that, a "welding torch movement unit" which moves or stops the welding torch 10 is configured to include the robot driving device 30, the power supply device 50, and the welding torch movement control unit 62.

The brazing filler metal feed control unit 63 controls the filler wire feeder 40 (see FIG. 3C) so that the brazing filler metal (filler wire F) is not fed during the arc discharge at the current value I1, and the brazing filler metal is welded to a position, where the plating layer K11 (Zn) has been evaporated, during the arc discharge at the current value I2. Hereby, the brazing filler metal is prevented from evaporating owing to heat of the arc discharge performed at the current value I1, and the brazing filler metal is welded to the part in which the plating layer K11 coating the first base material K1 has been evaporated. Note that, a "brazing filler metal feed unit" which feeds the brazing filler metal is configured to include the filler wire feeder 40, the power supply device 50, and the brazing filler metal feed control unit 63.

<Processing Procedure of Arc Welding>

FIGS. 2A, 2B are explanatory views showing a procedure when performing an arc welding. Note that, FIGS. 2A, 2B are cross-sectional views seen from the left side by cutting a joint structure S by a plane, which is positioned slightly leftward of the welding line L shown in FIG. 1 and extended in the front and rear direction and in the up and down direction. Note that, a bent portion and a flat plate portion extending in the up and down direction out of the first base material K1 having the hook shape are not shown. The control device 60 alternately performs the plating layer removal process and the brazing filler metal welding process in accordance with the programs set in advance.

(Plating Layer Removal Process)

FIG. 2A is an explanatory view of the plating layer removal process. As described above, the first base material K1 is the plate-like member made of the Fe-based metal member subjected to the plating process with Zn, and the second base material K2 is the Al-based metallic member. Note that, in FIGS. 2A, 2B, the plating layer K11 included in the first base material K1 is also shown (omitted in FIG. 1).

In the plating layer removal process, in a state of stopping feed of the brazing filler metal, the control device 60 melts and scatters (removes) the plating layer K11 by performing arc discharge at the current value I1 while moving the welding torch 10 along the welding line L. For example, at the time t0 to t1 in FIG. 3A, the arc discharge control unit 61 (see FIG. 1) controls the welding current from the TIG power supply 52 so that the arc discharge is performed at the current value I1. The current value and the voltage value during the arc discharge are detected respectively by the current detector 53 and the voltage detector 54 (see FIG. 1), and inputted to the control unit 60. When the plating layer K11 of the first base material K1 is melted and scattered owing to heat of the arch discharge, an Fe-based metallic member K12 of the corresponding part is exposed.

As shown in FIG. 3B, at the time t0 to t1, the welding torch movement control unit 62 (see FIG. 1) moves the welding torch 10 at a predetermined speed V along the welding line L. The predetermined speed V is set in advance so that the plating layer K11 of the first base material K1 can be removed and the beads of a predetermined size can be formed in a brazing filler metal welding process to be described later.

Incidentally, the filler wire guide G is moved at the predetermined speed V by the multi-axis articulated robot so as to follow the welding torch 10 from behind while maintaining the relative position with respect to the welding torch 10. By this forward movement in the traveling direction, the tip end of the filler wire F is separated from a surface of the bead formed immediately before and is positioned in front of the bead (see FIG. 2A). Further, when the tip end of the filler wire F is separated from the surface of the bead, the filler wire F may be pulled by a predetermined distance by the filler wire feeder 40 in a direction opposite to the direction of feeding the filler wire F.

As shown in FIG. 3C, at the time t0 to t1, the brazing filler metal feed control unit 63 (see FIG. 1) stops feed of the filler wire F which is the brazing filler metal. Hereby, the tip end of the filler wire F can be prevented from entering the arc, and thereby the filler wire F can be prevented from evaporating owing to heat of the arc discharge at the current value I1.

(Brazing Filler Metal Welding Process)

FIG. 2B is an explanatory view showing the brazing filler metal welding process. In the brazing filler metal welding process, in a state of stopping a movement of the welding torch 10, the control unit 60 performs arc discharge at the current value I2 (<I1) while feeding the brazing filler metal, and welds the brazing filler metal to a position where the plating layer K11 on the welding line L has been removed.

For example, at the time t1 to t2 in FIG. 3A, the arc discharge control unit 61 (see FIG. 1) controls the welding current from the TIG power supply 52 so as to perform arc discharge at the current value I2. As described above, the current value I2 is set as a value to melt the brazing filler metal (that is, ZnSi).

As shown in FIG. 3B, at the time t1 to t2, the welding torch movement control unit 62 (see FIG. 1) stops the movement of the welding torch 10. Hereby, the welding torch 10 stays at a position where the plating layer K11 of the first base material K1 has been removed in the plating layer removal process immediately before.

As shown in FIG. 3C, at the time t1 to t2, the brazing filler metal feed control unit 63 (see FIG. 1) feeds the filler wire F which is the brazing filler metal at a predetermined speed W. Note that, the predetermined speed W is set in advance according to a melting amount of the filler wire F per unit time so that the tip end of the filler wire F is soaked in the molten pool P in the brazing filler metal welding process. That is, the predetermined speed W is set so that the tip end of the filler wire F does not collide with the base material because the feed speed is too fast, and so that the tip end of the filler wire F does not leave the molten pool P because the feed speed is too slow.

The tip end of the filler wire F which is fed melts in a vicinity of the surface of the bead formed immediately before. At this time, the arc is positioned in front of the tip end of the filler wire F (that is, the filler wire F does not enter the arc: see FIG. 2B). The tip end of the filler wire F is melt by the residual heat due to the arc discharge performed immediately before at the current value I1, and by the radiant heat of the arc discharge positioned in front of the tip end of the filler wire F.

The molten pool P is formed by melting the fed filler wire F. The molten pool P spreads wetly on each of the base materials K1, K2, and reaches the arc of the current value I2. Since the filler wire F is fed continuously at the predetermined speed W, the filler wire F is heated indirectly through the molten pool P by heat of the arc discharge, to be maintained in the molten state. By heating the filler wire F indirectly through the molten pool P without placing the filler wire F in the arc as described above, the filler wire F (brazing filler metal) can be reliably prevented from evaporating or melting to be a droplet.

As shown in FIGS. 3A, 3B, 3C, the control device 60 performs alternately the plating layer removal process and the brazing filler metal welding process. Hereby, the scaly beads are formed on the welding line L, and the first base material K1 and the second base material K2 are welded.

<Joint Interface>

By arc welding the first base material K1 which is the Fe-based metallic member K12 (base material main body) coated with the plating layer K11 containing Zn, and the second base material K2 which is the Al-based metallic member, by the ZnSi-based brazing filler metal, the brazing filler metal and each of the base materials K1, K2 form the following three-layer structure therebetween. That is, the three-layer structure between the brazing filler metal and each of the base materials K1, K2 includes a first layer which is adjacent to the Fe-based metallic member K12 and mainly composed of Fe, a second layer which is adjacent to the Al-based metallic member and mainly composed of Zn, and an ultrathin third layer (for example, $Fe_3Al_2Si_3$) which is interposed between the first and second layers and mainly composed of Si. Note that, "Fe layer", "Zn layer", and "Si layer" shown in FIG. 5A corresponds to the first layer, the second layer, and the third layer, respectively.

In this manner, by interposing the third layer mainly composed of Si between the first layer and the second layer, the Fe-based metallic member K12 and the second base material K2 which is the Al-based metallic member can be prevented from diffusing to react with each other. Therefore, a hard and brittle Fe—Al-based intermetallic compound layer (for example, $Fe_2Al_5$) can be prevented from being formed on the joint interface, and thereby a joint strength (tensile strength, peel strength) can be enhanced.

<<Effects>>

The arc welding apparatus 100 according to the present embodiment performs, in the plating layer removal process, in the state of stopping feed of the brazing filler metal, the arc discharge at the current value I1 while moving the welding torch 10 along the welding line L, to remove the plating layer K11. In this manner, by removing the plating layer K11 of the first base material K1 by heat of the arc discharge, it is possible to expose the Fe-based metallic member K12 which has been previously coated with the plating layer K11. Further, during the arc discharge at the current value I1, by stopping feed of the brazing filler metal, the brazing filler metal can be prevented from evaporating owing to heat of the arc discharge.

Further, in the brazing filler metal welding process, in the state of stopping the movement of the welding torch 10, the arc welding apparatus 100 performs the arc discharge at the current value I2 smaller than the current value I1 while feeding the brazing filler metal, and welds the brazing filler metal to the position where the plating layer K11 has been removed. Therefore, the base materials can be welded in the state where the plating layer K11 is not interposed between the brazing filler metal and the two base materials K1, K2. Hereby, the joint strength (tensile strength, peel strength) can be significantly enhanced in comparison with the conventional technology.

Further, the filler wire which is the brazing filler metal is not heated directly by the arc discharge, but is heated indirectly by soaking the tip end thereof in the molten pool P. That is, since the tip end of the filler wire F is not placed in the arc, the filler wire F can be prevented from evaporating or melting to be a droplet. Therefore, the welding can be performed smoothly while stabilizing the state of the joint interface and the size of the molten pool P.

Comparison with Comparative Example

FIGS. 6A, 6B, and 6C are time charts of a process of an arc welding apparatus according to a comparative example. In the comparative example, a pulsed welding current is applied by alternately switching a predetermined current value I3 and a current value I4 (<I3) (see FIG. 6A). The comparative example is different from the above embodiment (see FIGS. 3B, 3C) of the present invention in that the welding torch 10 is moved at a constant speed V (see FIG. 6B) and the filler wire F is fed at a constant speed W (see FIG. 6C) regardless of the variation of the welding current.

FIG. 4 is a graph showing temperature variations in a vicinity of a joint interface between a brazing filler metal and base materials, in the arc welding apparatus according to the present embodiment (solid line) and the arc welding apparatus according to the comparative example (one-dot chain line). Note that, data shown in FIG. 4 is obtained by detecting temperature of a joint interface at a predetermined detection point H (see FIG. 1) on the welding line L, to plot the time variation of the detected temperatures. Further, the temperature T1 is a temperature when the plating layer K11 of the first base material K1 melts and scatters (that is, the melting point of Zn: 1200° C.). At the time t10 to t12, the welding torch 10 approaches the detection point H by being advanced toward the detection point H, at around the time t12, the brazing filler metal is welded to the point to be welded, and after the time t12, the welding torch 10 moves away from the detection point H by being advanced further.

At the times t11, t12, and t13, the interface temperatures are raised in both of the present embodiment and the comparative example, because the arc discharge is performed at the current value I1 (in the comparative example, the current value I3) sequentially behind, just above, and in front of the detection point H (see FIG. 1). In the comparative example, the current value I3 is inevitable to be set low (I3<I1) in order not to evaporate the filler wire F which is fed continuously during welding, and the interface temperature at the current I3 does not reach the melting point T1 (approximately 1200° C.) of the plating layer K11 (see time t12 in FIG. 4). As a result, Al is diffused to the side of the Fe-based metallic member K12 (see FIGS. 2A, 2B), and a brittle Fe—Al-based intermetallic compound layer is formed on the joint interface as shown in FIG. 5B, and thereby the joint interface is weakened.

On the other hand, in the present embodiment, the arc discharge is performed at the current I1 to melt and scatter the plating layer K11 while the filler wire F is not fed. Hereby, the interface temperature exceeds the melting point of the plating layer K11 at the time t12 in FIG. 4, and the inside Fe-based metallic member K12 (see FIGS. 2A, 2B) is exposed. Further, by melting the brazing filler metal by performing arc discharge at the current I2, the brazing filler metal is welded directly on the Fe-based metallic member K12 (and the second base material K2).

Figure 5A:
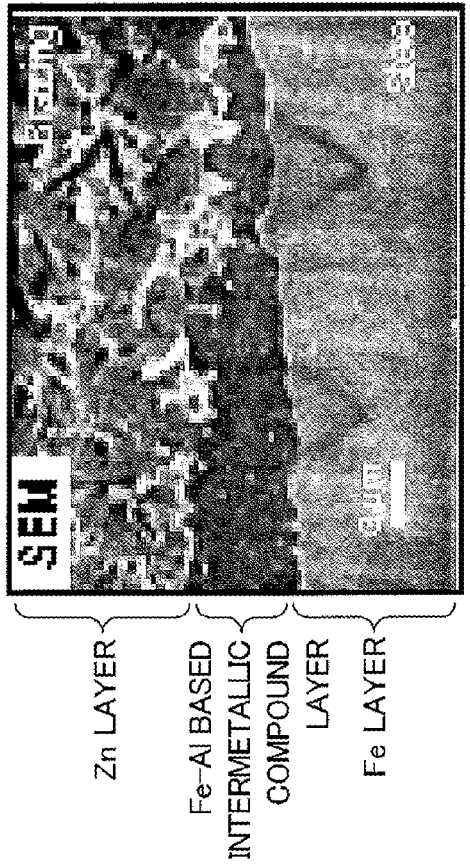
FIG. 5A is a cross-sectional enlarged photograph of the joint interface in a case of using the arc welding apparatus according to the present embodiment.
Figure 5B:
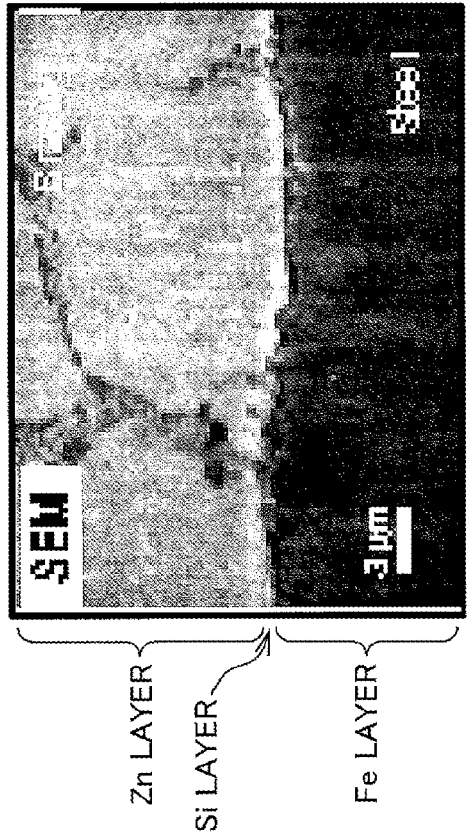
FIG. 5B is a cross-sectional enlarged photograph of the joint interface in a case of using the arc welding apparatus according to the comparative example.

Therefore, as shown in FIG. 5A, the ultrathin third layer (Si layer) is formed between the first layer (Fe layer) and the second layer (Zn layer). Therefore, Al can be prevented from diffusing to the side of the Fe-based metallic member (first base material K1). As a result, the Fe—Al-based intermetallic compound layer can be prevented from being formed on the joint interface (see FIG. 5B), and the strength of the joint interface is significantly enhanced in comparison with the comparative example.

Modified Example

Although the arc welding apparatus 100 according to the present invention has been described in detail above, the present invention is not limited to the above embodiment, but is possible to be appropriately modified without departing from a scope of the purport of the present invention. For example, in the above embodiment, there has been described a case in which a time period (for example, time t1 to t2: see FIGS. 3A, 3B, 3C) for performing the arc welding at the current value I2 and a time period for feeding the brazing filler metal are the same with each other, however, it is not limited thereto. That is, after the arc current is switched to the current value I2 from the current value I1, the feed of the brazing filler metal may be started after a predetermined time elapses. Further, when a predetermined time elapses after finishing the feed of the brazing filler metal, the arc current may be switched to the current value I1 from the current value I2. Hereby, the brazing filler metal can be reliably prevented from evaporating owing to the arch discharge at the current value I1.

Further, in the above embodiment, there has been described a case in which only the first base material K1 has been subjected to the plating process, however, it is not limited thereto. That is, also in a case where both of the first base material K1 and the second base material K2 have been subjected to the plating process with Zn (or a metal other than Zn), the arc welding can be performed in the same manner. Further, in the above embodiment, there has been described a case in which the first base material K1 (Fe-based metal K12) and the second base material K2 (Al base metal) are different kinds of metals from each other, however, it is not limited thereto. That is, the two base materials may be a metal of the same kind. Further, the current value I1, the current value I2, the time of the arc discharge at the respective current values, and the like can be appropriately set in accordance with the kind of the base material or plated metal, a use, or the like.

Further, in the above embodiment, there has been described a case of performing arc discharge at the current value I1 in the plating layer removal process, so that the plating layer K11 of the first base material K1 melts and scatters, however, it is not limited thereto. That is, the current value I1 may be set so that the plating such as Zn is evaporated (that is, so that it is higher than the boiling point of the metal forming the plating layer K11). Even in this case, the plating layer K11 is removed by the arc discharge.

Further, in the above embodiment, there has been described a case of feeding the tip end of the filler wire F so as to be soaked in the molten pool P in the brazing filler metal welding process, however, it is not limited thereto. That is, by setting low the current value I2 for melting the brazing filler metal, the filler wire F may be melted in the arc.

Further, in the above embodiment, there has been described a case in which the control device 60 performs the arc welding automatically by controlling the multi-axis articulated robot or the like, however, it is not limited thereto. For example, the devices for performing the arc welding may be operated by a human at the timing described in FIGS. 2A, 2B, 3A, 3B, 3C. Further, in the above embodiment, there has been described a case in which the welding line L is linear, however, it is not limited thereto. For example, the welding may be performed by swinging (that is, by weaving) the welding torch 10 to the left and right with respect to the joint portion of the two base materials. In this case, the welding line L is a polygonal line.

Further, in the above embodiment, there has been described a case of arc welding the first base material K1 which is the Fe-based metallic member subjected to the plating process with Zn, and the second base material K2 which is the Al-based metallic member, by the ZnSi-based brazing filler metal, however, it is not limited thereto. For example, a SP steel plate (bare steel plate) subjected to the plating process with AlSi may be used as the first base material. Further, a magnesium alloy may be used as the second base material. Furthermore, as the brazing filler metal, a mixture of ZnSi in combination with one or more out of Ti, Mn, and Sn may be used. Note that, the above currents I1, I2 are preferably set appropriately in accordance with component materials of the first base material, the second base material, the plating layer, and the brazing filler metal.

REFERENCE SIGNS LIST

100: arc welding apparatus
10: welding torch
11: non-consumable electrode
12: nozzle
20: gas feed device
30: robot driving device (welding torch movement unit)
40: filler wire feeder (brazing filler metal feed unit)
50: power supply device (arc discharge unit, welding torch movement unit, brazing filler metal feed unit)
60: control device
61: arc discharge control unit (arc discharge unit)

62: welding torch movement control unit (welding torch movement unit)
63: brazing filler metal feed control unit (brazing filler metal feed unit)
F: filler wire (brazing filler metal)
G: filler wire guide
K1: first base material (base material)
K11: plating layer
K2: second base material (base material)
L: welding line
S: joint structure
P: molten pool

The invention claimed is:

1. An arc welding method for arc welding two base materials with a brazing filler metal, at least one of the two base materials having a plating layer thereon, and comprising a plating layer removal process and a brazing filler metal welding process, which are performed alternately, wherein
   the plating layer removal process removes the plating layer by performing arc discharge at a first current value while moving a welding torch along a welding line without feeding the brazing filler metal, and
   the brazing filler metal welding process welds the brazing filler metal to a position where the plating layer is removed, by performing arc discharge at a second current value smaller than the first current value while feeding the brazing filler metal without moving the welding torch, and wherein
   one of the two base materials is a first base material which is an Fe-based metallic member coated with the plating layer containing Zn, the other is a second base material which is an Al-based metallic member, and
   the brazing filler metal is a ZnSi-based brazing filler metal.

2. The arc welding method as set forth in claim 1, wherein in the brazing filler metal welding process, a tip end of a filler wire which is the brazing filler metal is positioned behind an arc in a traveling direction thereof, and the filler wire is fed so that the tip end thereof is soaked in a molten pool.

3. An arc welding apparatus for arc welding two base materials, at least one of which has a plating layer thereon, by a brazing filler metal, comprising:
   a welding torch which performs arc discharge between the welding torch and the two base materials;
   an arc discharge unit which performs arc discharge by supplying the welding torch with two currents alternately, one of the two currents corresponding to a first current value for removing the plating layer by the arc discharge, and the other corresponding to a second current value which melts the brazing filler metal and is smaller than the first current value;
   a welding torch movement unit which moves the welding torch along a welding line during the arc discharge at the first current value, and stops a movement of the welding torch during the arc discharge at the second current value; and
   a brazing filler metal feed unit which does not feed the brazing filler metal during the arc discharge at the first current value, and feeds the brazing filler metal during the arc discharge at the second current value so as to be welded to a position where the plating layer is removed, wherein
   one of the two base materials is a first base material which is an Fe-based metallic member coated with the plating layer containing Zn, the other is a second base material which is an Al-based metallic member, and
   the brazing filler metal is a ZnSi-based brazing filler metal.

* * * * *